(12) United States Patent
Arai et al.

(10) Patent No.: US 11,179,962 B2
(45) Date of Patent: Nov. 23, 2021

(54) PENCIL LEAD

(71) Applicant: MITSUBISHI PENCIL COMPANY, LIMITED, Tokyo (JP)

(72) Inventors: Hiroyuki Arai, Fujioka (JP); Satoru Banzai, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/319,945

(22) PCT Filed: Jun. 12, 2017

(86) PCT No.: PCT/JP2017/021690
§ 371 (c)(1),
(2) Date: Jan. 23, 2019

(87) PCT Pub. No.: WO2018/020866
PCT Pub. Date: Feb. 1, 2018

(65) Prior Publication Data
US 2019/0263172 A1 Aug. 29, 2019

(30) Foreign Application Priority Data

Jul. 27, 2016 (JP) .............................. JP2016-147666

(51) Int. Cl.
*B43K 23/00* (2006.01)
*B43K 19/14* (2006.01)
(Continued)

(52) U.S. Cl.
CPC .............. *B43K 19/14* (2013.01); *B43K 19/02* (2013.01); *B43K 19/18* (2013.01); *C09D 13/00* (2013.01);
(Continued)

(58) Field of Classification Search
CPC ........ B43K 19/14; B43K 19/02; B43K 19/18; C09D 13/00; C09D 163/00; C08K 3/36
(Continued)

(56) References Cited

U.S. PATENT DOCUMENTS 9,896,591 B2 * 2/2018 Arai ..................... C09D 163/00
2018/0030223 A1 * 2/2018 Kodera ............... C08F 297/026

FOREIGN PATENT DOCUMENTS

JP         7-34024 A     2/1995
JP      2000-290350 A   10/2000
(Continued)

OTHER PUBLICATIONS

International Search Report dated Jul. 18, 2017, issued in counterpart International Application No. PCT/JP2017/021690 (2 pages).
(Continued)

*Primary Examiner* — Jennifer C Chiang
(74) *Attorney, Agent, or Firm* — Westerman, Hattori, Daniels & Adrian, LLP

(57) ABSTRACT

In a pencil lead manufactured through a baking step regardless of being a black lead or a colored lead, the mechanical strength of the pencil lead is further increased by coating a surface thereof with a resin. A pencil lead includes a baked lead body whose surface is covered by a covering layer made of resin that has a scratch hardness of HB or greater. The scratch hardness of the resin as a subject resin is defined as a lowest hardness index of a tester pencil that is able to form an indentation on a surface of a horizontal flat plate coated with a 5-μm thick film of the subject resin, when the surface is scratched by the tester pencil being pressed onto the surface at an angle of 45° with a load of 7.355 N.

8 Claims, 1 Drawing Sheet

(51) Int. Cl.
*B43K 19/02* (2006.01)
*B43K 19/18* (2006.01)
*C09D 13/00* (2006.01)
*C08K 3/04* (2006.01)
*C08K 5/092* (2006.01)
*C08K 5/098* (2006.01)
*C08K 13/02* (2006.01)
*C08K 3/38* (2006.01)

(52) U.S. Cl.
CPC ............... *C08K 3/04* (2013.01); *C08K 5/092* (2013.01); *C08K 5/098* (2013.01); *C08K 13/02* (2013.01); *C08K 2003/385* (2013.01); *C08K 2201/014* (2013.01); *C08K 2201/017* (2013.01)

(58) Field of Classification Search
USPC ................................................ 401/49, 91, 96
See application file for complete search history.

(56) References Cited

FOREIGN PATENT DOCUMENTS

| | | |
|---|---|---|
| JP | 2002-348516 A | 12/2002 |
| JP | 2008-189873 A | 8/2008 |
| JP | 5219341 B2 | 6/2013 |
| JP | 2015-160887 A | 9/2015 |
| JP | 2017-110145 A | 6/2017 |

OTHER PUBLICATIONS

Chujo, "Organic-Inorganic Nano-Hybrid Materials", The Micromeritics, Hosokawa Powder Research Institute, Oct. 30, 2006, No. 50, pp. 11-15, with concise explanation of relevance, Cited in Specification. (6 pages).

Extended (Supplementary) European Search Report dated Feb. 17, 2020, issued in counterpart application No. 17833876 0. (5 pages).

* cited by examiner

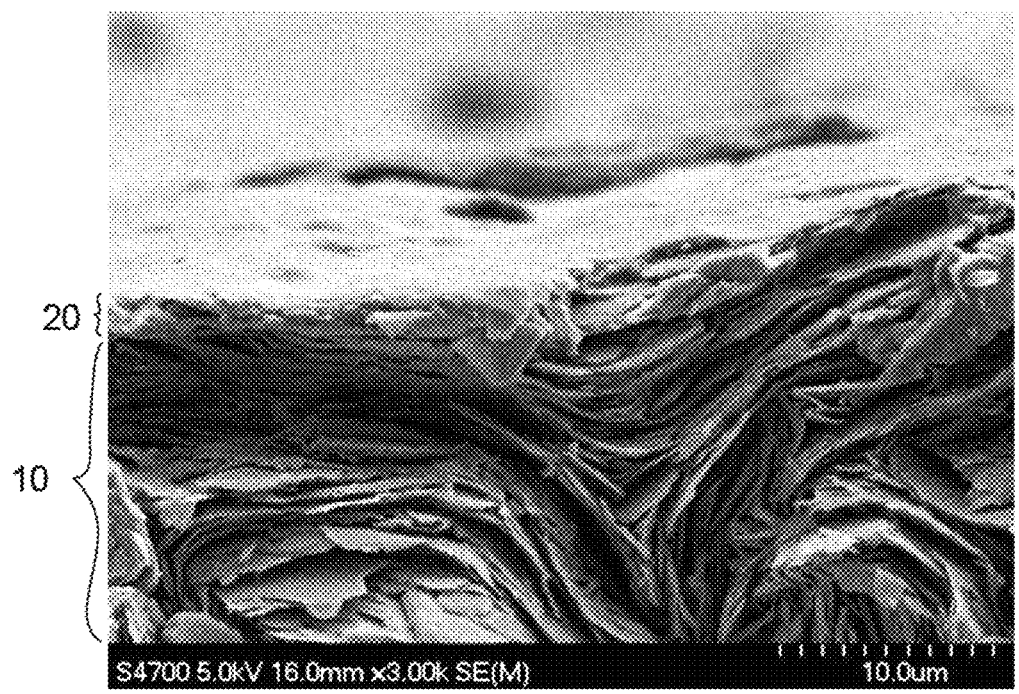

PENCIL LEAD

TECHNICAL FIELD

The present invention relates to a pencil lead comprising a lead body whose surface is covered by a covering layer made of resin.

BACKGROUND ART

Pencil leads are broadly classified into black leads whose main component is graphite, and colored leads in which a pigment or a dye is added as a coloring material to the compositional materials. It is essential for the former leads to be processed in a baking step in their manufacturing procedures. On the other hand, some of the latter leads are manufactured through such a baking step, and some are not. Such a pencil lead manufactured through a baking step exhibits a porous structure having innumerable fine pores.

It is common for a colored lead manufactured by baking (a so-called colored pencil lead) that a white or grey porous lead body is first manufactured, and thereafter a dye ink is impregnated into the pores. In the invention disclosed in JP 2015-160887 A, a resin is filled into the pores for the purpose of increasing the strength of the lead body.

Although it is possible to manufacture a colored pencil lead with fine pores formed therein without undergoing a baking step, a technique has been disclosed by which a moisture-proof film is formed on a surface of such a non-baked colored pencil lead by coating the surface with an organic-inorganic hybrid material for the purpose of preventing aging deterioration due to moisture absorption.

SUMMARY OF INVENTION

Technical Problem

Although the surface of a non-baked lead is coated in JP 2002-348516 A, there has heretofore not been an idea of coating a baked lead with a resin.

Thus, the problem of the present invention is, in a pencil lead that is manufactured through a baking step regardless of being a black lead or a colored lead, to further increase the mechanical strength of the pencil lead by coating a surface thereof with a resin.

Solution to Problem

In consideration of the above-described topic, a pencil lead relating to the present invention is a pencil lead that comprises a baked lead body. A surface of the baked lead body is covered by a covering layer made of resin. A scratch hardness of the resin constituting the covering layer is HB or greater. The scratch hardness of the resin as a subject resin is defined as a lowest hardness index of a tester pencil that is able to form an indentation on a surface of a horizontal flat plate coated with a 5-μm thick film of the subject resin, when the surface is scratched by the tester pencil being pressed onto the surface at an angle of 45° with a load of 7.355 N, in a state in which a tip end of a lead of the tester pencil has been left in a cylindrical shape while its distal end has been shaved in a flat plane.

The "pencil lead" in the present invention is not only limited to a pencil lead installed within a wood shaft in a usual pencil, and also includes a pencil lead of a diameter of around 2 to 3 mm that is refillably installed in a so-called lead holder, and also includes a lead for a so-called mechanical pencil. Further, for any kind of pencil leads, it does not matter whether it is a black lead or a colored lead. Moreover, the main material thereof is graphite or boron nitride or the like and is not particularly limited, and the pencil lead is formed through a baking step.

Note that the "subject resin" is a conceptual resin for defining the scratch hardness, and the scratch hardness of the "resin" that is concretely used in the present invention is measured as such a "subject resin" in accordance with the above-described definition.

Thus, the subject resin is coated to a "5-μm thick film" concretely by the following method.

Namely, first, in order to sufficiently immerse the subject resin to a brush, part of the subject resin is applied to a clean surface other than a testing plate so as to prepare a condition of the brush, and a mass of the brush is weighed in this condition. On the other hand, a necessary amount of the subject resin for the subject resin to be spread in a dried 5-μm thick film in a predetermined area is determined in advance. Then, the necessary amount of the subject resin is precisely measured out by a syringe, and is pushed out on the surface of the testing plate and spread, and this is uniformly coated in the predetermined area by the brush. Whether or not the necessary amount of the subject resin has been applied on the surface is confirmed by whether or not the mass of the brush, as weighed again after the application, is the same as the mass before the application.

Note that the above-described measurement of the scratch hardness is actually carried out in accordance with JIS K 5600-5-4. Here, the above-described load of 7.355 N corresponds to 750 g wt. that serves as a load prescribed in this JIS K 5600-5-4.

The surface, onto which the subject resin has been applied in this way, is scratched by tester pencils in order from a soft lead to a hard lead as described above. Among the tester pencils that successfully form indentations on the surface, the lowest hardness index of the test pencil having the softest lead is defined as the "scratch hardness" of the subject resin. Further, a subject resin whose scratch hardness is found to be HB or greater is used as the "resin" of the present invention, which is coated on the surface of the pencil lead, and the "covering layer" is formed.

Even the pencil lead, which is coated with a thinner coating layer less than 1 μm formed on the surface of the baked lead body by the resin having the scratch hardness of HB or greater, has an improved bending strength compared with the one coated by a resin having a scratch hardness lower than HB. Further, in a case in which the pencil lead is made to be a mechanical pencil lead, the holding strength by a chuck holding a lead also improves. Here, the hardness index "HB" of a pencil that is prescribed as the scratch hardness is in accordance with hardness index in Europe and Japan, and this corresponds to "#2" of the hardness index in the United States.

Note that it is desirable to select the resin from the group consisting of organic-inorganic hybrid resins, polyolefin resins, vinyl resins, furan resins, ABS resins, phenol resins, ketone resins, maleic acid resins, acrylic resins, urea resins, urethane resins, epoxy resins, silicone resins, imide resins, amide resins, and fluorine resins.

Here, the "organic-inorganic hybrid resin" means a "combination of an inorganic material and an organic material", and means "in particular, a resin at which the combining thereof is at the nano level, and, in some cases, at the molecular level". Such an organic-inorganic hybrid material has a feature of "having excellent mechanical strength and heat-resistance while being flexible, like a plastic" (cf.

Yoshiki CHUJO, "Organic-Inorganic Nano-Hybrid Materials", The Micromeritics, Hosokawa Powder Research Institute, Oct. 30, 2006, No. 50, p. 11-15).

The type of this organic-inorganic hybrid resin is not particularly limited, but it is desirable to use a silica-organic hybrid resin. Here, the "silica-organic hybrid resin" means a hybrid resin whose materials are silica as the inorganic material and an organic synthetic resin as the organic material. Concretely, resins that are generally available commercially such as silica-epoxy hybrid resins, silica-phenol hybrid resins, silica-polyamic acid hybrid resins, silica-polyamide hybrid resins, or silica-acrylic hybrid resins or the like, can be used. However, from a viewpoint of the strength of the pencil lead after being coated, it is particularly desirable to use the silica-epoxy hybrid resin.

Further, in a case in which the baked lead body is a colored lead, it is desirable that the above-described covering layer further comprises a coloring material. Thus, for example, the color of the colored lead can be shown clearly by the covering layer, and the design also can be improved. Of course, even in a case in which the baked lead body is a black lead, the design may be improved by purposely including, in the covering layer, a coloring material of a color other than black. Moreover, by using a pigment as the coloring material, light-fastness can also be imparted to the lead surface.

Further, if the above-described covering layer further comprises an ultraviolet absorber, light-fastness also can be imparted to the pencil lead.

Moreover, if the above-described covering layer further comprises an antistatic agent, an antistatic performance also can be imparted to the pencil lead.

Advantageous Effects of Invention

In accordance with the present invention, in a pencil lead that is manufactured through a baking step regardless of being a black lead or a colored lead, the mechanical strength of the pencil lead can be further increased by coating the surface thereof with a resin.

BRIEF DESCRIPTION OF DRAWINGS

FIG. 1 is the cross-section of a lead of Example 2 photographed by a scanning election microscope.

DESCRIPTION OF EMBODIMENTS (1) Boron Nitride Baked Lead Body

Boron nitride powder and a resin to be a binder are mixed (a plasticizer can also be added as appropriate), and the mixed composition is kneaded. The kneaded mixture is extrusion molded into a thin linear shape. This molded product is heated and baked in an oxygen-free atmosphere such as in an inert gas, and a baked lead body of boron nitride and a binder carbon is formed. By heating and baking this baked lead body in an oxygen-containing atmosphere, the binder carbon is oxidized and eliminated, and a porous baked lead body of only boron nitride is obtained. This porous baked lead body is white.

This white-colored porous baked lead body is immersed for a predetermined time in a liquid in which a coloring material and an organic solvent are mixed to make the coloring material impregnated in the pores. Thereafter, the porous baked lead body is dried, and the organic solvent is eliminated.

Finally, this porous baked lead body is immersed in oil to make the oil impregnated in the pores, and a colored lead is completed. Note that any oil can be used provided that it is an oil that is generally used in impregnation into a baked lead body, such as liquid paraffin or the like.

Then, the above-described baked lead body is immersed for a predetermined time in a liquid in which an organic-inorganic hybrid resin (in particular, a silica-organic hybrid resin) and an organic solvent are mixed, and thereafter, by drying and eliminating the organic solvent, the surface is coated by the resin. Note that the coating by the resin may be carried out as a step between the coloring material impregnating step and the oil impregnating step as described above.

Here, depending on the diameter size at the time of extrusion molding of the above-described kneaded mixture, the colored lead can also be formed as a pencil lead for a wood shaft and a refill lead for a lead holder of a final diameter of around 2 to 3 mm. Further, the colored lead can also be formed as refill leads for mechanical pencils of various thicknesses whose final diameters are 0.3 mm or greater and 1 mm or less.

Note that the baked lead body can also be formed as a white lead, without including any coloring material in the above-described porous baked lead body.

(2) Graphite Baked Lead Body

Graphite in a form of a powder or flakes and a resin to be a binder are mixed (a plasticizer can also be added as needed), and further dispersed and kneaded. The kneaded mixture is extrusion molded into a thin linear shape. This molded product is heated and baked in an oxygen-free atmosphere such as in an inert gas, and a baked lead body of graphite and a binder carbon is formed. This porous baked lead body is black. Then, this porous baked lead body is immersed in oil to make the oil impregnated in the pores, and a graphite lead is completed. Note that any oil can be used provided that it is an oil that is generally used in impregnation into a baked lead body, such as liquid paraffin or the like.

Then, the above-described baked lead body is immersed for a predetermined time in a liquid in which an organic-inorganic hybrid resin (in particular, a silica-organic hybrid resin) and an organic solvent are mixed, and thereafter, by drying and eliminating the organic solvent, the surface is coated by the resin. Note that the coating by the resin may be carried out as a step between the coloring material impregnating step and oil impregnating step as described above.

Here, depending on the diameter size at the time of extrusion molding the above-described kneaded mixture, the graphite lead can also be formed as a pencil lead for a wood shaft and a refill lead for a lead holder of a final diameter of around 2 to 3 mm. Further, the graphite lead can also be formed as refill leads for mechanical pencils of various thicknesses whose final diameters are 0.3 mm or greater and 1 mm or less. EXAMPLES (1) BORON NITRIDE BAKED LEAD A composition of the following combination was kneaded by a pressurizing kneader and a two-roll kneader, and this kneaded mixture was extrusion molded into a thin linear shape by an extruder, and was baked for 5 hours at 1,000° C. in an inert gas (nitrogen gas) circumstance, and a baked lead (hereinafter called a "BN lead") of boron nitride and a binder carbon was obtained.

Boron nitride powder: 50 wt. %

Polyvinylchloride resin (binder resin): 40 wt. %

Dioctyl phthalate (plasticizer): 10 wt. %

This BN lead was further baked for 12 hours at 700° C. in the atmosphere, and a baked lead body of only boron nitride was prepared. Silicate 40 (Colcoat) was impregnated therein, and, after drying, the lead was baked for 5 hours at 1,000° C. in an inert gas circumstance, and a white baked lead body was obtained.

A composition formed from a coloring material and an organic solvent of the following combination was impregnated into this white baked lead body, and the lead body was dried for 12 hours at 80° C.

Spilon red C—PH (dye coloring material, Hodogaya Chemical): 20 wt. %

Isopropyl alcohol (organic solvent): 80 wt. %

Into the pores obtained by this drying, α-olefin oil (SpectraSyn 4, ExxonMobil) was impregnated for 6 hours at 100° C., and a red mechanical pencil lead of a diameter of 0.564 mm and a length of 60 mm was obtained. This red BN lead was used as Examples 1 to 10 and Comparative Example 1 and 2 described hereinafter.

(2) GRAPHITE BAKED LEAD

A composition of the following combination was mixed and dispersed by a Henschel mixer and kneaded by a pressurizing kneader and a two-roll kneader, and this kneaded mixture was extrusion molded into a thin linear shape by an extruder. Thereafter, the plasticizer was dried and eliminated, and further, by carrying out a baking treatment for 10 hours at 1,000° C. in an inert gas (nitrogen gas) circumstance, a graphite baked lead (hereinafter called a "graphite lead") of graphite and a binder carbon was obtained.

Natural graphite A flakes: 40 wt. %

Polyvinylchloride resin (binder resin): 40 wt. %

Sodium stearate (surfactant): 1 wt. %

Dioctyl phthalate (plasticizer): 19 wt. %

Note that the above-listed natural graphite A flakes had an ab-surface of a flatness of 0.2 μm, an mv-value of 8 μm, a thickness of the c-axis of 1 μm, and an aspect ratio of 8. Into this lead body, α-olefin oil (SpectraSyn 4, ExxonMobil) was impregnated for 6 hours at 100° C., and a black mechanical pencil lead of a diameter of 0.564 mm and a length of 60 mm was obtained. This graphite lead was used in Example 11 and Comparative Example 3 described hereinafter.

(3) EXAMPLES (3-1) Example 1

After the above-described BN lead was immersed in a resin solution of the following composition, it was removed, and the solvent was dried, and a covering layer of a film thickness of around 1 μm was formed on the surface.

Organic-inorganic hybrid resin (COMPOCERAN E203, silica-epoxy hybrid resin, Arakawa Chemical Industries): 15 wt. %

Organic solvent (isopropyl alcohol): 85 wt. %

Note that the scratch hardness of the coated film of a film thickness of 5 μm formed by the above-described resin solution was 8H.

(3-2) Example 2

After the above-described BN lead was immersed in a resin solution of the following composition, it was removed, and the solvent was dried, and a covering layer of a film thickness of around 1 μm was formed on the surface. Note that the cross-section of the lead of present Example 2 as photographed by a scanning electron microscope is FIG. 1. In the figure, a BN lead 10 portion of a blackish hue appears as if thin layers are superposed like a mille-feuille pastry, and it can be seen that a covering layer 20 of a whitish hue is formed on the surface layer thereof. Referring to the scale at the lower right of the drawing, the thickness of the covering layer 20 is approximately 1.0 μm, although there are fluctuations depending on the region. By the way, cross-sectional images that were about such as that of this drawing are confirmed in the other Examples as well.

Organic-inorganic hybrid resin (COMPOCERAN E203, silica-epoxy hybrid resin, Arakawa Chemical Industries): 15 wt. %

Pigment coloring material (MHI red, Mikuni Pigment): 60 wt. %

Organic solvent (isopropyl alcohol): 25 wt. %

Note that the scratch hardness of the coated film of a film thickness of 5 μm formed by the above-described resin solution was 8H.

(3-3) Example 3

After the above-described BN lead was immersed in a resin solution of the following composition, it was removed, and the solvent was dried, and a covering layer of a film thickness of around 1 μm was formed on the surface.

Organic-inorganic hybrid resin (COMPOCERAN E203, silica-epoxy hybrid resin, Arakawa Chemical Industries): 15 wt. %

Ultraviolet absorber (HALSHYBRID UV-G Nippon Shokubai): 3 wt. %

Organic solvent (isopropyl alcohol): 82 wt. %

Note that the scratch hardness of the coated film of a film thickness of 5 μm that was formed by the above-described resin solution was 8H.

(3-4) Example 4

After the above-described BN lead was immersed in a resin solution of the following composition, it was removed, and the solvent was dried, and a covering layer of a film thickness of around 1 μm was formed on the surface.

Organic-inorganic hybrid resin (COMPOCERAN E203, silica-epoxy hybrid resin, Arakawa Chemical Industries): 15 wt. %

Pigment coloring material (MHI red, Mikuni Pigment): 60 wt. %

Antistatic agent (Haisera, Miyazaki Chemical): 3 wt. %

Organic solvent (isopropyl alcohol): 22 wt. %

Note that the scratch hardness of the coated film of a film thickness of 5 μm that was formed by the above-described resin solution was 8H.

(3-5) Example 5

After the above-described BN lead was immersed in a resin solution of the following composition, it was removed, and the solvent was dried, and a covering layer of a film thickness of around 1 μm was formed on the surface.

Epoxy resin (825, Mitsubishi Chemical): 15 wt. %

Organic solvent (isopropyl alcohol): 85 wt. %

Note that the scratch hardness of the coated film of a film thickness of 5 μm that was formed by the above-described resin solution was 3H.

(3-6) Example 6

After the above-described BN lead was immersed in a resin solution of the following composition, it was removed, and the solvent was dried, and a covering layer of a film thickness of around 1 μm was formed on the surface.

Ketone resin (K-90, Arakawa Chemical Industries): 15 wt. %

Organic solvent (isopropyl alcohol): 85 wt. %

Note that the scratch hardness of the coated film of a film thickness of 5 μm that was formed by the above-described resin solution was 3H.

(3-7) Example 7

After the above-described BN lead was immersed in a resin solution of the following composition, it was removed, and the solvent was dried, and a covering layer of a film thickness of around 1 μm was formed on the surface.

Urea resin (Fleamin, Daiwa Co., Ltd.): 15 wt. %

Organic solvent (isopropyl alcohol): 85 wt. %

Note that the scratch hardness of the coated film of a film thickness of 5 μm that was formed by the above-described resin solution was 3H.

(3-8) Example 8

After the above-described BN lead was immersed in a resin solution of the following composition, it was removed, and the solvent was dried, and a covering layer of a film thickness of around 1 μm was formed on the surface.

Fluorine resin (FG-5040, Fluoro Technology Co., Ltd.): 15 wt. %

Organic solvent (isopropyl alcohol): 85 wt. %

Note that the scratch hardness of the coated film of a film thickness of 5 μm that was formed by the above-described resin solution was 3H.

(3-9) Example 9

After the above-described BN lead was immersed in a resin solution of the following composition, it was removed, and the solvent was dried, and a covering layer of a film thickness of around 1 μm was formed on the surface.

Silicone resin (MRS-102, Yoshida KSK): 15 wt. %

Organic solvent (isopropyl alcohol): 85 wt. %

Note that the scratch hardness of the coated film of a film thickness of 5 μm that was formed by the above-described resin solution was 3H.

(3-10) Example 10

After the above-described BN lead was immersed in a resin solution of the following composition, it was removed, and the solvent was dried, and a covering layer of a film thickness of around 1 μm was formed on the surface.

Acrylic resin (A-1980XB, DIC): 15 wt. %

Organic solvent (isopropyl alcohol): 85 wt. %

Note that the scratch hardness of the coated film of a film thickness of 5 μm that was formed by the above-described resin solution was 3H.

(3-11) Example 11

After the above-described graphite lead was immersed in a resin solution of the following composition, it was removed, and the solvent was dried, and a covering layer of a film thickness of around 1 μm was formed on the surface.

Organic-inorganic hybrid resin (COMPOCERAN E203, silica-epoxy hybrid resin, Arakawa Chemical Industries): 15 wt. %

Pigment coloring material (MHI red, Mikuni Pigment): 60 wt. %

Organic solvent (isopropyl alcohol): 25 wt. %

Note that the scratch hardness of the coated film of a film thickness of 5 μm that was formed by the above-described resin solution was 8H.

(4) COMPARATIVE EXAMPLES

(4-1) Comparative Example 1

The above-described BN lead was used as is.

(4-2) Comparative Example 2

After the above-described BN lead was immersed in a resin solution of the following composition, it was removed, and the solvent was dried, and a covering layer of a film thickness of around 1 μm was formed on the surface.

Silicone resin (805 resin, Toray/Dow Corning): 15 wt. %

Organic solvent (isopropyl alcohol): 85 wt. %

Note that the scratch hardness of the coated film of a film thickness of 5 μm that was formed by the above-described resin solution was B.

(4-3) Comparative Example 3

The above-described graphite lead was used as is.

(5) TESTING METHODS

(5-1) Strength Test

The bending strength (unit: MPa) was measured for one hundred samples in accordance with JIS S 6005:2007, and the average was determined.

(5-2) Chuck Holding Force Test

In a state of being set in a mechanical pencil, the lead was let out, and, in a state of being held by a chuck, the mechanical pencil was set perpendicular to a writing surface, and perpendicularly downward force was applied, and the force (unit: N) at the time when lead slip-through (which means that the lead was pushed and sent back in) occurred was measured. This measurement was carried out immediately after the lead was set, and after being knocked 10,000 times in the state in which the lead was set, respectively.

(5-3) Light-Fastness Test

The lower half of the lead was covered in an aluminum foil so as to not be exposed, and the lead was set in a light-fastness testing fade meter (manufactured by Suga Testing Instruments, X25). After being exposed for 100 hours, it was visually confirmed whether or not the exposed portion had faded and the hue thereof had changed as compared with the portion covered by the aluminum foil. The evaluation standard was "A" in a case in which there was hardly any change in color, and "B" for a case in which fading occurred and a change in color was seen.

(5-4) Charging Performance Test

In a state in which twenty leads were placed in a case, the leads were left for one day in a room of a temperature of 25° C. and a humidity of 10%. Thereafter, the case was shaken for one minute at a speed of around 2 times per second. The cover of the case was then opened, and the case was tilted such that the cover side thereof faced directly downward, and the number of leads that fell out was counted. The evaluation standard was "A" in a case in which the number of leads that fell out was 10 or more, and "B" in a case in which the number was 9 or less.

(6) TEST RESULTS

The respective test results of above (5) are as per following Table 1. Note that the "-" in the table means, for the type of resin and scratch hardness, that coating by a resin was not carried out, and means, for light-fastness and charging performance, that testing was not carried out.

Example 3, in which an ultraviolet absorber was added, had an excellent light-fastness as compared with each of Examples 1 and 5 to 10, in which neither of the pigment coloring material nor the ultraviolet absorber was added, thereby it can be expected that chronological color fading the lead color will be prevented.

Further, from the results of Example 4, a static electricity preventing effect also could be expected due to the addition of an antistatic agent to the covering layer.

(6-2) Graphite Lead

As to the graphite lead, Example 11 in which the covering layer was formed had an excellent bending strength and chuck holding force in as compared with Comparative Example 3 in which a covering layer is not formed. Note that, although not directly related to light-fastness, in Example 11, a red tint that is different from the black color of the lead could be expressed on the lead surface by adding the coloring material, thereby the design could be improved.

TABLE 1

| Example/Comparative example | Lead type | Resin type | Scratch hardness | Contained components ||| Strength (MPa) | Chuck holding force (N) || Light-fastness | Charging performance |
| | | | | Coloring material | Anti-static agent | Ultra-violet absorber | | Immediately after setting | After knocking 10,000 times | | |
| --- | --- | --- | --- | --- | --- | --- | --- | --- | --- | --- | --- |
| Example 1 | BN | Organic-inorganic | 8H | No | No | No | 170 | 25.6 | 18.6 | B | B |
| Example 2 | BN | Organic-inorganic | 8H | Yes | No | No | 169 | 27.8 | 19.1 | A | B |
| Example 3 | BN | Organic-inorganic | 8H | No | No | Yes | 168 | 26.2 | 19.2 | A | B |
| Example 4 | BN | Organic-inorganic | 8H | Yes | Yes | No | 165 | 27.9 | 20.1 | A | A |
| Example 5 | BN | Epoxy resin | 3H | No | No | No | 155 | 27.2 | 20.2 | B | B |
| Example 6 | BN | Ketone resin | 3H | No | No | No | 152 | 26.9 | 17.9 | B | B |
| Example 7 | BN | Urea resin | 3H | No | No | No | 156 | 27.8 | 20.8 | B | B |
| Example 8 | BN | Fluorine resin | 3H | No | No | No | 154 | 23.4 | 16.4 | B | B |
| Example 9 | BN | Silicone resin | 3H | No | No | No | 154 | 23.7 | 14.7 | B | B |
| Example 10 | BN | Acrylic resin | 3H | No | No | No | 145 | 26.5 | 19.5 | B | B |
| Example 11 | Graphite | Organic-inorganic | 8H | Yes | No | No | 420 | 27.1 | 18.1 | — | — |
| Comparative example 1 | BN | — | — | No | No | No | 135 | 19.1 | 15.7 | B | B |
| Comparative example 2 | BN | Silicone resin | B | No | No | No | 138 | 23.5 | 19.5 | B | B |
| Comparative example 3 | Graphite | — | — | No | No | No | 398 | 18.8 | 14.8 | — | — |

(6-1) BN Lead

As to the BN lead, each of Examples 1 to 10 in which the covering layer was formed had an excellent bending strength and an excellent chuck holding force as compared with Comparative Example 1 in which the covering layer was not formed.

Moreover, each of Examples 1 to 10, in which the covering layer was formed by a resin whose scratch hardness was HB or greater, had an excellent bending strength as compared with Comparative Example 2 in which the covering layer was formed by a resin of a different product having a scratch hardness lower than HB.

Further, among Examples 1 to 10, each of Examples 1 to 4 in which the resin had a relatively high scratch hardness of 8H had an excellent bending strength as compared with each of Examples 5 to 10 in which the resin had a relatively low scratch hardness of 3H.

Note that each of Examples 2 and 4, in which a pigment coloring material was added to the covering layer, and

INDUSTRIAL APPLICABILITY

The present invention can be used as a pencil lead or a mechanical pencil lead.

The invention claimed is:

1. A pencil lead comprising a baked lead body, wherein:
   a surface of the baked lead body is covered by a covering layer made of resin, and
   a scratch hardness of the resin constituting the covering layer is 3H or greater, the scratch hardness of the resin as a subject resin being defined as a lowest hardness index of a tester pencil that is able to form an indentation on a surface of a horizontal flat plate coated with a 5-μm thick film of the subject resin, when the surface is scratched by the tester pencil being pressed onto the surface at an angle of 45° with a load of 7.355 N, in a state in which a tip end of a lead of the tester pencil has been left in a cylindrical shape while its distal end has been shaved in a flat plane.

2. The pencil lead of claim 1, wherein the resin is selected from the group consisting of organic-inorganic hybrid resins, polyolefin resins, vinyl resins, furan resins, ABS resins, phenol resins, ketone resins, maleic acid resins, acrylic resins, urea resins, urethane resins, epoxy resins, silicone resins, imide resins, amide resins, and fluorine resins.

3. The pencil lead of claim 1, wherein the covering layer further comprises a coloring material.

4. The pencil lead of claim 1, wherein the covering layer further comprises an ultraviolet absorber.

5. The pencil lead of claim 1, wherein the covering layer further comprises an antistatic agent.

6. The pencil lead of claim 2, wherein the covering layer further comprises a coloring material.

7. The pencil lead of claim 2, wherein the covering layer further comprises an ultraviolet absorber.

8. The pencil lead of claim 2, wherein the covering layer further comprises an antistatic agent.

\* \* \* \* \*